(12) United States Patent
Oza

(10) Patent No.: US 11,770,183 B2
(45) Date of Patent: *Sep. 26, 2023

(54) COMPENSATION FOR ATTENUATION OF CARRIER POWER BY A TRANSMISSION PATH

(71) Applicant: Rajeev Oza, Boyds, MD (US)

(72) Inventor: Rajeev Oza, Boyds, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,462

(22) Filed: Nov. 21, 2022

(65) Prior Publication Data

US 2023/0084347 A1   Mar. 16, 2023

Related U.S. Application Data

(63) Continuation of application No. 17/363,316, filed on Jun. 30, 2021, now Pat. No. 11,533,103.

(Continued)

(51) Int. Cl.
*H04W 52/18* (2009.01)
*H04B 7/185* (2006.01)
(Continued)

(52) U.S. Cl.
CPC ..... *H04B 7/18543* (2013.01); *H04B 7/18582* (2013.01); *H04W 52/143* (2013.01); *H04W 52/241* (2013.01); *H04W 72/0453* (2013.01)

(58) Field of Classification Search
CPC ........... H04B 7/18543; H04B 7/18582; H04W 52/143; H04W 52/241; H04W 72/0453
See application file for complete search history.

(56) References Cited

U.S. PATENT DOCUMENTS 5,257,415 A * 10/1993 Kumagai .............. H04L 5/0044
455/127.2
5,754,942 A *  5/1998 Wachs ...................... H04J 4/00
455/13.4

(Continued)

FOREIGN PATENT DOCUMENTS

EP   0828353 A2   3/1998

OTHER PUBLICATIONS

International Search Report for International Application No. PCT/US2021/065221.

*Primary Examiner* — Hai V Nguyen
(74) *Attorney, Agent, or Firm* — Capitol City TechLaw; Jasbir Singh

(57) ABSTRACT

A system and method for compensating for attenuation of carrier power by a transmission path. The method includes defining a path from a gateway to a measurement tap, where the path may include an output port of the gateway and path components used to reach the measurement tap; sweeping, in bands, an RF spectrum served by the RFT by sending a signal at a respective band and a band power from the output port over the path; measuring, at the measurement tap, a power metric for each of the bands; capturing, for each of the bands, power level (PL) data including a frequency start of the respective band, a frequency end of the respective band, the respective band power and the respective power metric at the measurement tap; and setting a carrier power level (CPL) of a carrier having a frequency start and a frequency end, where the CPL is based on the PL data associated with one more of the bands included in the frequency start and the frequency end, where the path components may include one or more connecting cables, one or more switches, and one or more equipment in the path.

20 Claims, 3 Drawing Sheets

Related U.S. Application Data

(60) Provisional application No. 63/134,652, filed on Jan. 7, 2021.

(51) Int. Cl.
*H04W 52/24* (2009.01)
*H04W 52/14* (2009.01)
*H04W 72/0453* (2023.01)

(56) References Cited

U.S. PATENT DOCUMENTS

| | | | | |
|---|---|---|---|---|
| 5,790,939 A * | 8/1998 | Malcolm | ............ | H04B 7/18513 370/324 |
| 6,438,453 B1 * | 8/2002 | Kochanneck | .......... | B63G 8/001 901/1 |
| 7,916,680 B2 * | 3/2011 | Miller | ............... | H04L 1/0011 455/12.1 |
| 8,098,748 B1 * | 1/2012 | Mansour | .................. | H04L 1/24 370/252 |
| 8,379,574 B2 * | 2/2013 | Hilborn | ............... | H04W 52/386 370/328 |
| 9,069,870 B2 * | 6/2015 | Howard | ................ | G06F 16/958 |
| 9,287,911 B1 * | 3/2016 | Chindapol | ............. | H04B 1/406 |
| 9,661,579 B1 * | 5/2017 | Zhang | .................. | H04W 52/34 |
| 9,667,339 B2 * | 5/2017 | Charrat | ................ | H04B 7/2041 |
| 9,722,308 B2 * | 8/2017 | Emerick | ................ | H01Q 21/28 |
| 10,462,752 B2 * | 10/2019 | Beattie, Jr. | ............ | H04W 52/42 |
| 10,827,438 B2 * | 11/2020 | Griffioen | ................ | H04B 17/13 |
| 11,310,714 B1 * | 4/2022 | Marupaduga | ....... | H04W 52/143 |
| 11,336,493 B1 * | 5/2022 | Patel | ....................... | H04L 27/01 |
| 11,533,103 B2 * | 12/2022 | Oza | ..................... | H04B 7/18543 |
| 11,589,315 B2 * | 2/2023 | Roy | .................. | H04W 72/0473 |
| 2001/0006888 A1 | 7/2001 | Posti et al. | | |
| 2006/0268924 A1 * | 11/2006 | Marinier | ............. | H04W 52/241 370/445 |
| 2007/0072545 A1 * | 3/2007 | Karabinis | .......... | H04B 7/18539 455/12.1 |
| 2008/0298275 A1 * | 12/2008 | De Sousa | ............. | H04W 16/18 455/562.1 |
| 2009/0186584 A1 * | 7/2009 | Lambrecht | ............ | H04W 52/42 455/67.11 |
| 2011/0222589 A1 * | 9/2011 | Howell | .............. | H04B 7/18519 375/213 |
| 2011/0235598 A1 * | 9/2011 | Hilborn | ............... | H04W 52/244 455/501 |
| 2015/0042536 A1 * | 2/2015 | Emerick | .................. | H01Q 1/48 343/843 |
| 2015/0295637 A1 * | 10/2015 | Charrat | ................ | H04B 7/2041 370/316 |
| 2016/0064813 A1 * | 3/2016 | Emerick | .................. | H01Q 1/526 343/841 |
| 2016/0183264 A1 * | 6/2016 | Rasmussen | ........ | H04M 1/72505 370/329 |
| 2017/0078978 A1 * | 3/2017 | Scipione | ............... | H04W 52/18 |
| 2018/0146479 A1 * | 5/2018 | Rasmussen | ........ | H04W 72/0453 |
| 2019/0007129 A1 * | 1/2019 | Vargas | ................. | H04B 7/1858 |
| 2019/0174427 A1 * | 6/2019 | Beattie, Jr. | ............ | H04W 52/42 |
| 2019/0313346 A1 * | 10/2019 | Griffioen | ................ | H04W 52/34 |
| 2020/0021913 A1 * | 1/2020 | Shah | ....................... | G06F 3/167 |
| 2021/0160786 A1 * | 5/2021 | Roy | .................. | H04B 7/18543 |
| 2022/0216914 A1 * | 7/2022 | Oza | ..................... | H04W 52/143 |

\* cited by examiner

COMPENSATION FOR ATTENUATION OF CARRIER POWER BY A TRANSMISSION PATH

CROSS-REFERENCE TO RELATED APPLICATIONS AND INCORPORATION BY REFERENCE

The present application is a continuation of U.S. Non-Provisional application Ser. No. 17/363,316 filed Jun. 30, 2021, and claims the benefit under 35 U.S.C. 119(e) of U.S. Provisional Application Ser. No. 63/134,652, filed Jan. 7, 2021, which are incorporated herein by reference in their entireties.

FIELD

The present teachings compensate for attenuations and non-linearities of carrier power by a transmission path used in a communication system. A method and system to dynamically set an appropriate carrier power at runtime to compensate for the attenuations and non-linearities. Necessary compensation may be determined via a calibration exercise to capture relevant information.

BACKGROUND

Prior to the present teachings, the process of setting transmit power for individual carriers was manual. In a communication system that uses different carriers, power levels have to be adjusted and tuned to account for varying attenuation in a transmission path the adjustments are typically done manually. The attenuation may be due to non-linear characteristics of the path specific attenuation. In a satellite-based communication system, this could be due to non-linear Radio Frequency Transmitter (RFT) flatness. In any communication system, this could also be due to the carrier taking a different transmission path due to redundancy available for different components in the path— including, but not limited to different cables, switches, splitters, wave guides etc.

In existing systems, the carrier power setting is a manual task every time any component in the transmission path changes, or every time any carrier is modified. Components in the path can be, but not limited to, modulators, cables, switches, splitters, wave guides etc. In operational systems, carrier measurement data from installed test or customer terminal base is gathered over a couple of days of period to fine tune the carrier power further.

SUMMARY OF THE INVENTION

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Any, satellite based or other, communication system that requires multiple carriers and needs to adjust a transmit power of those carriers to account for possible variations over time may use the present teachings. The adjustment to a transmit power may be due to carrier changes or component changes in the transmission path. The improvements and benefits of using an Automatic Carrier Power Setting (ACPS) in the system are:

Network operators or RF engineers need not perform carrier balancing or carrier setting exercise after each carrier plan change.

ACPS allows for automatic carrier changes in a system where carriers can be reconfigured programmatically.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for compensating for attenuation of carrier power by a transmission path. The method includes defining a path from a gateway to a measurement tap, where the path may include an output port of the gateway and path components used to reach the measurement tap; sweeping, in bands, an RF spectrum served by the RFT by sending a signal at a respective band and a band power from the output port over the path; measuring, at the measurement tap, a power metric for each of the bands; capturing, for each of the bands, power level (PL) data including a frequency start of the respective band, a frequency end of the respective band, the respective band power and the respective power metric at the measurement tap; and setting a carrier power level (CPL) of a carrier having a frequency start and a frequency end, where the CPL is based on the PL data associated with one or more of the bands included in the frequency start and the frequency end, where the path components may include one or more connecting cables, one or more switches, and one or more equipment in the path. Other embodiments of this aspect include corresponding computer systems, apparatus, and computer programs recorded on one or more computer storage devices, each configured to perform the actions of the methods.

Implementations may include one or more of the following features. The method where the band power of each of the bands is same and a frequency range of each of the bands is same. The measurement tap may include an antenna flange of the RFT. The path may include a satellite. The measurement tap may be disposed along an uplink from the RFT to a satellite. The measurement tap may include an antenna flange of a receiver antenna. The method may include changing the path components; and updating the PL data and the CPL to reflect the changing. The carrier may include a plurality of carriers, and for each of the carriers the CPL is computed. The setting may include computing the CPL based on an area under a curve of the PL data from the frequency start to the frequency end. The method further may include transmitting over the path by varying a desired power level of the carrier at the measurement tap based on the CPL. Implementations of the described techniques may include hardware, a method or process, or computer software on a computer-accessible medium.

One general aspect includes a system to compensate for attenuation of carrier power by a transmission path. The system includes a path from a gateway to a measurement tap, where the path may include an output port of the gateway and path components used to reach the measurement tap; a power level module to sweep, in bands, an RF spectrum served by the RFT by sending a signal at a respective band and a band power from the output port over the path, to capture, for each of the bands, power level (PL) data including a frequency start of the respective band, a frequency end of the respective band, the respective band power and a respective power metric at the measurement tap; and to set a carrier power level (CPL) of a carrier having a frequency start and a frequency end. The system also includes a measurement module to measure, at the measurement tap, the power metric for each of the bands; where the CPL is based on the PL data associated with one more of the bands included in the frequency start and the frequency end, where the path components may include one or more connecting cables, one or more switches, and one or more equipment in the path. Other embodiments of this aspect include corresponding computer systems, apparatus, and computer programs recorded on one or more computer storage devices, each configured to perform the actions of the methods. Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1A:
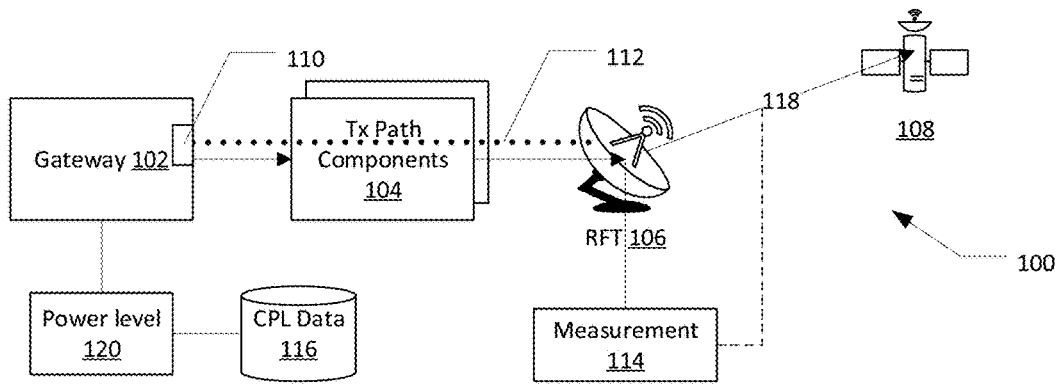
FIG. 1A illustrates a transmission path up to an RFT according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Introduction

The present teachings set carrier power automatically to account for RFT flatness and other variability of signal attenuation over different transmission paths based on calibration data. The calibration data may be collected and captured at a commissioning of a gateway, a Radio Frequency Transmitter (RFT) equipment at the gateway, or a component in a Tx path.

Gateway: Location that has RF link to the satellite to transmit and receive data from terminals and that has terrestrial or other connectivity to be able to link the terminals to the internet.

RFT: Radio Frequency Transmitter for the Gateway.

Terminal/VSAT: End-user Very Small Aperture Terminal, End-user satellite antenna and modem.

Transmission Path Up to an RFT

FIG. 1A illustrates a transmission path up to an RFT according to various embodiments.

A satellite communication system 100 may include a Gateway 102, Tx path components 104 and an RFT 106. The Tx path components 104 connect an output port 110 of the gateway 102 with the RFT 106. The Tx path components 104 may include cables, switches and other Tx components. In the system 100, the measurements of the measurement module may be used to vary power at the output port 110 of the gateway 102 for a given path and carrier to achieve a desired output power at a measurement tap per a Link Budget calculation.

An output power metric may be measured with a measurement module 114 at a measurement tap. The output power metric may be captured in the form of Carrier Power Level (CPL), path attenuation, RFT output power or any other related measurement that is usable to derive the power at the output port 110 of the gateway 102 for a given path and carrier. In some embodiments, there can be multiple/redundant paths to a measurement tap differentiated by one or more of the output port 110, the Tx path components 104 or combinations thereof. In some embodiments, a gateway 102 may have multiple output ports 110. Components of the system 100 defining each of the multiple paths may be represented as a unit.

The path 112 may be defined based on a selection of a measurement tap. The measurement tap may be at an antenna flange of the RFT 106. As such, the path 112 includes the output port 110, the Tx path components 104 and the measurement tap (antenna flange of the RFT 106). For example, the path 112 may include an output port 110, Tx path components 104 (including connecting cables, switches, any other equipment in the path) up to a Traveling-wave tube amplifier (TWTA) connecting to the RFT 106 antenna flange.

In some embodiments, the measurement tap may be disposed along a travel path of uplink 118 radiated from the RFT 106. The path 112 may be defined as the output port 110, the Tx path components 104, the RFT 106 and the uplink 118 measurement tap.

In order to obtain power level data 116 based on measured data along each path in the system 100, a power level module 120 at the gateway 102 may help output a carrier of desired size based on a granularity of frequency bands for which measurements are needed. At the desired granularity of frequency bands for a carrier size, the gateway 102 may sweep an entire Radio Frequency (RF) spectrum that the RFT 106 can serve. In some embodiments, a Carrier Power Level (CPL) for each measurement of each of the multiple paths may be computed and stored as power level data 116 by the power level module 120. The multiple paths may provide different redundancy paths while in operation and measurements for each of the multiple paths may be noted as calibration results. The power level module 120 may receive the power metrics from the measurement module 114.

Transmission Path Up to a User Equipment

In some embodiments, a satellite may support adjustment and tuning of carrier power to account for non-linearity caused due to satellite transponders. Some satellite systems lack that capability.

Figure 1B:
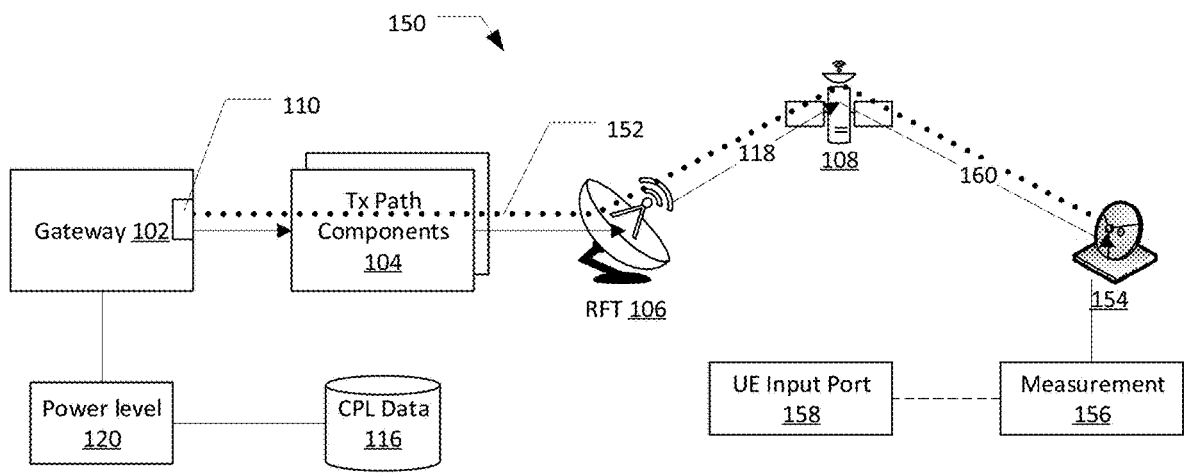
FIG. 1B illustrates a transmission path including a satellite and a UE according to various embodiments.

FIG. 1B illustrates a transmission path including a satellite and a UE according to various embodiments.

A satellite communication system 150 may include a Gateway 102, Tx path components 104 and a RFT 106. A path 152 may connect the output port 110 of the gateway 102 with a receiver antenna 154. The path 152 may include the output port 110, the Tx path components 104, the RFT 106, the uplink 118, the satellite 108, a downlink 160 and an antenna flange of the receiver antenna 154. In such embodiments, the antenna flange of the receiver antenna 154 as the measurement tap for the path 152. Components of the path 152 included in defining the path 152 may be represented as a unit. The Tx path components 104 may include cables, switches and other Tx components. In some embodiments, there can be multiple, possibly redundant, paths to connect the gateway 102 to the receiver antenna 154. The receiver antenna 154 may be installed and enabled in different spotbeams or shaped beams to perform a local measurement with a measurement module 156 for the path 152.

In some embodiments of the system 150, a measurement tap may be desired at an input port UE 158. In some embodiments of the system 150, a measurement tap may be desired along a downlink 160.

In some embodiments, the local measurements may be sent back to the gateway 102 via satellite communications, terrestrial communications, or the like. A proper Carrier Power Level (CPL) at different frequencies may be stored as power level data 116 for each of the multiple paths 152 based on the local measurement made with the measurement module 156.

Measurement

The present teachings may record measurements for a carrier size based on granularity of measurements needed. Using larger carrier sizes results in fewer measurements but may hide non-linearities within a frequency range of the carrier. Using smaller carrier sizes during calibration process results in a larger dataset that may capture finer non-linearities of the attenuations in the path.

Figure 2:
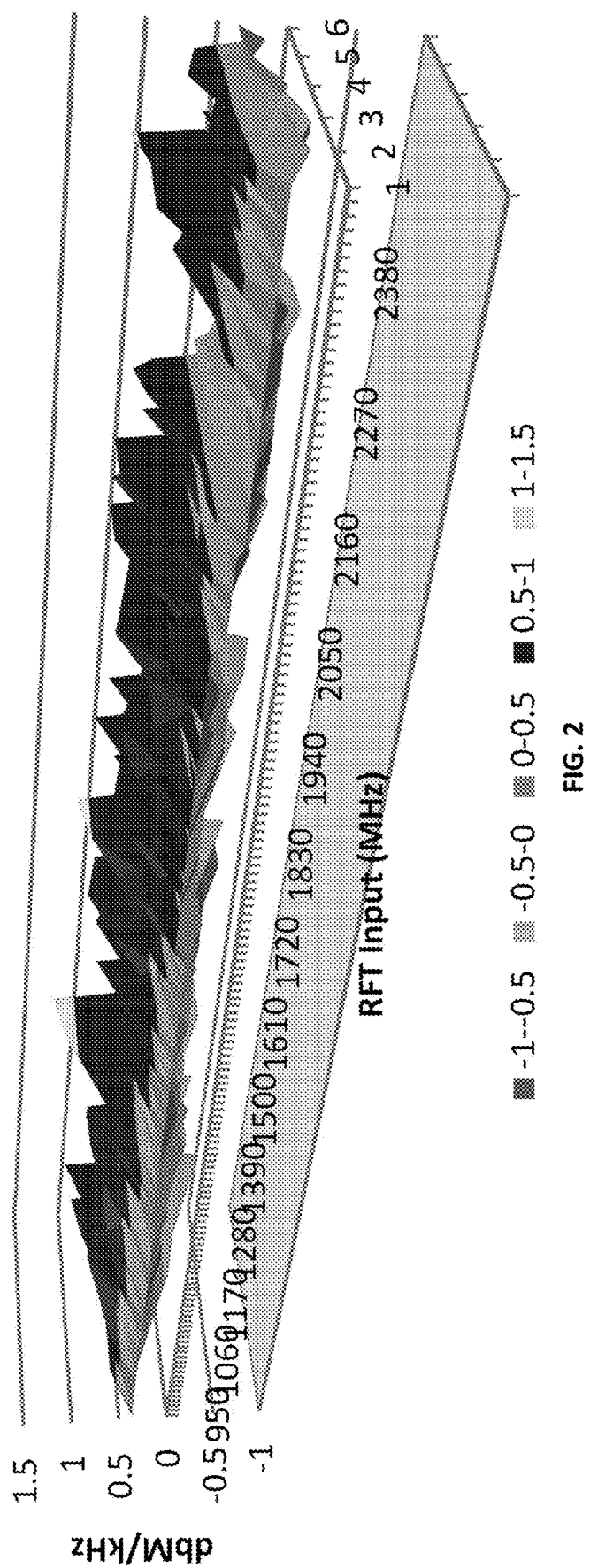
FIG. 2 illustrates calibration result data for multiple paths according to various embodiments.

FIG. 2 illustrates calibration result data for multiple paths according to various embodiments.

FIG. 2 illustrates a CPL measurement as a plot illustrating:
RFT Input (MHz)
Redundancy Path Identifier
dBm/kHz or dBm/MHz gateway output power as measured at a measurement tap In FIG. 2, the dBm/kHz or dBm/MHz gateway output power is shown on a vertical axis for paths 1-6 (depths axis) for an RFT frequency spectrum, here 950 MHz to 2400 MHz (horizontal axis). The illustration may be captured as a configuration in a convenient format, for example, a list, a table in a database, csv, j son, XML or the like. The granularity of the frequency bands, Tx or Rx, in the configuration may be implementation specific. The granularity may be uniformly stepped, for example, 25, 40, 50, 75 MHz or the like. The granularity stepping need not be uniform. For example, a frequency band of a first granularity may span 50 MHz and a second different and non-overlapping granularity may have a frequency band that spans 100 MHz. The frequency spectrum of a carrier or an RFT frequency spectrum may be non-contiguous.

In this specific example, gateway output power as measured at a measurement tap, for example, at an antenna flange of the RFT, along an uplink, along a downlink, an antenna flange of a receiver antenna, a UE input port, or the like. The metric measured at the measurement tap may be captured in the form of path attenuation, RFT output power or any other related measurement that can be used to derive required gateway transmit power for a frequency band.

For ease of measurement, a measurement may be performed by varying the RFT Input by sweeping a carrier of a desired band/granularity from start to end of an RFT's supported spectrum. The carrier power may be kept constant during the sweep. A deviation from desired power at the measurement tap, for example, the input of antenna flange at the RFT, at a UE or the like can be measured. A pretty good estimate of required transmit powers at the gateway may be obtained after a sweep. Subsequent sweeps may be used to get more accurate results that, for example, correct for measurement difference during a previous sweep, for example, the immediately preceding sweep.

Use of Power Level Data

After selecting a path and a frequency range, a gateway component may adjust the transmit power per the power level data. In some embodiments, a gateway may compute required carrier power based on size and location of the carrier on RF spectrum. Carrier power may be computed as an area under the curve for a given path the carrier is to take between the start and the end frequency of the carrier. A desired power level of a Tx carrier at a measurement tap may be provided by a link budget table.

Figure 3:
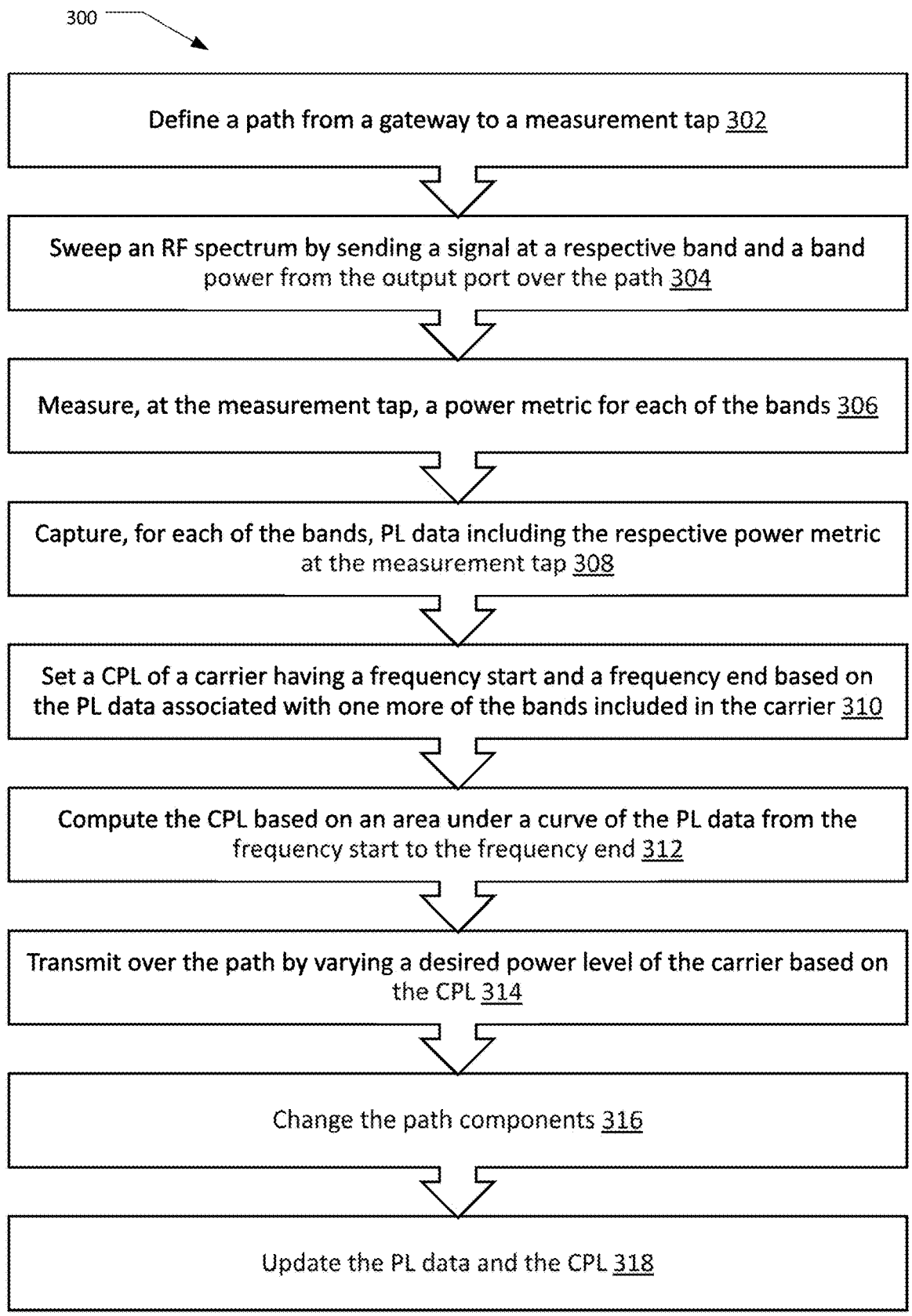
FIG. 3 illustrates a method for compensating for attenuation of carrier power by a transmission path according to various embodiments.

FIG. 3 illustrates a method for compensating for attenuation of carrier power by a transmission path according to various embodiments.

A method 300 for compensating for attenuation of carrier power by a transmission path may include an operation 302 to define a path from a gateway to a measurement tap. The method 300 may include an operation 304 to sweep an RF spectrum by sending a signal at a respective band and a band power from the output port over the path. The method 300 may include an operation 306 to measure, at the measurement tap, a power metric for each of the bands. The method 300 may include an operation 308 to capture, for each of the bands, PL data including the respective power metric at the measurement tap. The method 300 may include an operation 310 to set a CPL of a carrier having a frequency start and a frequency end based on the PL data associated with one or more of the bands included in the carrier. The method 300 may include an operation 312 to compute the CPL based on an area under a curve of the PL data from the frequency start to the frequency end. The method 300 may include an operation 314 to transmit over the path by varying a desired power level of the carrier based on the CPL. The method 300 may include an operation 316 to change the path components. The method 300 may include an operation 318 to update the PL data and the CPL.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

I claim:

1. A method for setting carrier power for bands of an RF spectrum, the method comprising;

defining a path from an output port to a measurement tap via path components to connect to the measurement tap;

sending, for the bands, a signal at a respective band and a band power from the output port over the path;

measuring, at the measurement tap, a power metric of the signal for each of the bands;

capturing, for each of the bands, Power Level (PL) data for the path comprising a frequency start of the respective band, a frequency end of the respective band, the respective band power and the respective power metric at the measurement tap; and setting a Carrier Power Level (CPL) of a carrier to be transmitted over the path, wherein the carrier comprises one or more of the bands and the CPL is based on the PL data associated with the one or more of the bands, wherein the path components comprise one or more equipment in the path.

2. The method of claim 1, wherein the path comprises one or more connecting cables and one or more switches.

3. The method of claim 1, wherein the sending uses a same level for the band power of each of the bands.

4. The method of claim 1, wherein one of the bands has a first granularity of frequency range, another of the bands has a second granularity of frequency range and the first granularity is different than the second granularity.

5. The method of claim 1, wherein the PL data comprises a path attenuation, an output power at the measurement tap of the band power during the sending.

6. The method of claim 1, further comprising transmitting over the path by varying the carrier power based on the CPL.

7. The method of claim 1, wherein the measurement tap comprises an antenna flange of a Radio Frequency Transmitter (RFT) and the output port comprises a gateway output port.

8. The method of claim 1, wherein the measurement tap is disposed along an uplink from an RFT to a satellite.

9. The method of claim 1, wherein the measurement tap comprises an antenna flange of a receiver antenna.

10. The method of claim 1, further comprising changing the path components; and updating the PL data and the CPL to reflect the changing.

11. The method of claim 1, wherein the carrier comprises a plurality of carriers, and for each of the carriers the CPL is computed.

12. The method of claim 1, wherein the setting comprises computing the CPL based on an area under a curve of the PL data from the frequency start to the frequency end.

13. A system to set carrier power for bands of an RF spectrum, the system comprising;

a path from an output port to a measurement tap via path components to connect to the measurement tap;

a power level module
to send, for the bands, a signal at a respective band and a band power from the output port over the path,
to capture, for each of the bands, Power Level (PL) data for the path comprising a frequency start of the respective band, a frequency end of the respective band, the respective band power and a respective power metric at the measurement tap, and
to set a Carrier Power Level (CPL) of a carrier of a carrier to be transmitted over the path, wherein the carrier comprises one or more of the bands and the CPL is based on the PL data associated with the one or more of the bands; and a measurement module to measure, at the measurement tap, the power metric for each of the bands, wherein the path components comprise one or more equipment in the path.

14. The system of claim 13, wherein the path comprises one or more connecting cables and one or more switches.

15. The system of claim 13, wherein one of the bands has a first granularity of frequency range, another of the bands has a second granularity of frequency range and the first granularity is different than the second granularity.

16. The system of claim 13, wherein the measurement tap is disposed along an uplink from an RFT to a satellite and the output port comprises a gateway output port.

17. The system of claim 13, wherein the power level module is configured to change the path components and to update the PL data and the CPL to reflect the changing.

18. The system of claim 13, wherein the carrier comprises a plurality of carriers, and for each of the carriers the CPL is computed.

19. The system of claim 13, wherein the power level module computes the CPL based on an area under a curve of the PL data from the frequency start to the frequency end.

20. The system of claim 13, wherein the power level module varies the carrier power based on the CPL for the path.

* * * * *